(12) United States Patent
Hoover et al.

(10) Patent No.: US 10,728,783 B2
(45) Date of Patent: Jul. 28, 2020

(54) METHODS AND APPARATUS FOR IMPROVING INTER-RADIO ACCESS TECHNOLOGY MEASUREMENTS

(71) Applicant: QUALCOMM Incorporated, San Diego, CA (US)

(72) Inventors: Scott Allan Hoover, Del Mar, CA (US); Arvind Vardarajan Santhanam, San Diego, CA (US); Srinivasan Balasubramanian, San Diego, CA (US); Kushang Desai, San Diego, CA (US); Vishal Hingorani, Del Mar, CA (US); Rajarajan Rajendran, San Diego, CA (US); Hua Feng, San Diego, CA (US); Michael Allen Corley, San Diego, CA (US); Selvi Shah, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 136 days.

(21) Appl. No.: 15/341,521

(22) Filed: Nov. 2, 2016

(65) Prior Publication Data

US 2017/0150386 A1 May 25, 2017

Related U.S. Application Data

(60) Provisional application No. 62/257,680, filed on Nov. 19, 2015.

(51) Int. Cl.
*H04W 24/10* (2009.01)
*H04W 76/28* (2018.01)
(Continued)

(52) U.S. Cl.
CPC ....... *H04W 24/10* (2013.01); *H04W 36/0088* (2013.01); *H04W 76/28* (2018.02); *H04W 36/14* (2013.01); *H04W 88/06* (2013.01)

(58) Field of Classification Search
CPC .. H04W 36/0088; H04W 24/10; H04W 76/28
See application file for complete search history.

(56) References Cited

U.S. PATENT DOCUMENTS

| 9,131,441 B2 | 9/2015 | Singhal et al. |
| 2014/0086209 A1* | 3/2014 | Su ............... H04W 74/02 370/331 |

(Continued)

FOREIGN PATENT DOCUMENTS

| WO | WO-2015123405 A1 | 8/2015 |
| WO | WO-2015144258 A1 | 10/2015 |
| WO | WO-2016160271 A1 | 10/2016 |

OTHER PUBLICATIONS

International Search Report and Written Opinion—PCT/US2016/060352—ISA/EPO—dated Feb. 13, 2017.

*Primary Examiner* — Hoon J Chung
(74) *Attorney, Agent, or Firm* — Patterson + Sheridan, LLP

(57) ABSTRACT

Certain aspects of the present disclosure relate to methods and apparatus for improving inter-Radio Access Technology (RAT) measurements. A user equipment (UE) determines, while in a connected state Discontinuous Reception (CDRX) mode in a first cell of a first Radio Access Technology Network (RAT), that a second cell of a second RAT is to be measured. The UE schedules at least two operational periods related to transitioning between ON and OFF states of the CDRX mode to overlap, to increase a period available for measuring signals in the second cell.

12 Claims, 13 Drawing Sheets

(51) Int. Cl.
  *H04W 36/00* (2009.01)
  *H04W 36/14* (2009.01)
  *H04W 88/06* (2009.01)

(56) References Cited

U.S. PATENT DOCUMENTS

| | | |
|---|---|---|
| 2015/0003410 A1 | 1/2015 | Yang et al. |
| 2015/0133061 A1 | 5/2015 | Wu et al. |
| 2015/0257041 A1 | 9/2015 | Su |
| 2015/0257042 A1 | 9/2015 | Su et al. |
| 2015/0304989 A1* | 10/2015 | Zhu .................. H04W 36/0066 370/252 |
| 2016/0081020 A1 | 3/2016 | Rahman et al. |
| 2016/0095159 A1 | 3/2016 | Su |

* cited by examiner

1100

1102

SELECT, WHILE IN A CONNECTED STATE DISCONTINUOUS RECEPTION (CDRX) MODE IN A FIRST CELL OF A FIRST RADIO ACCESS TECHNOLOGY NETWORK (RAT), A SECOND CELL FROM A PLURALITY OF CELLS OF A SECOND RAT FOR DECODING AT LEAST ONE CHANNEL TRANSMITTED IN THE SECOND CELL

1104

ASSIGN A SET OF CONTIGUOUS MEASUREMENT GAPS FOR DECODING THE AT LEAST ONE CHANNEL IN THE SECOND CELL, TO ALLOW FOR MEASUREMENT REPORTING OF THE SECOND CELL

FIG. 11

METHODS AND APPARATUS FOR IMPROVING INTER-RADIO ACCESS TECHNOLOGY MEASUREMENTS

This application claims priority to U.S. Provisional Application Ser. No. 62/257,680, entitled "METHODS AND APPARATUS FOR IMPROVING INTER-RADIO TECHNOLOGY MEASUREMENTS" filed on Nov. 19, 2015, which is expressly incorporated by reference herein in its entirety.

FIELD

The present disclosure relates generally to wireless communication, and more particularly, to methods and apparatus for improving inter-radio access technology measurements.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a User Equipment (UE). The method generally includes determining, while in a connected state Discontinuous Reception (CDRX) mode in a first cell of a first Radio Access Technology Network (RAT), that a second cell of a second RAT is to be measured, and scheduling at least two operational periods related to transitioning between ON and OFF states of the CDRX mode to overlap, to increase a period available for measuring signals in the second cell.

Certain aspects of the present disclosure provide a method for wireless communications by a User Equipment (UE). The method generally includes determining, while in a connected state Discontinuous Reception (CDRX) mode in a first cell of a first Radio Access Technology Network (RAT), that a second cell of a second RAT is to be measured; determining that a voice call is active in the first cell and one or more conditions relating to reporting of measurements of the second cell are met; and initiating an unscheduled measurement period for measuring a signal in the second cell, in response to the determination.

Certain aspects of the present disclosure provide a method for wireless communications by a User Equipment (UE). The method generally includes selecting, while in a connected state Discontinuous Reception (CDRX) mode in a first cell of a first Radio Access Technology Network (RAT), a second cell from a plurality of cells of a second RAT for decoding at least one channel transmitted in the second cell, and assigning a set of contiguous measurement gaps for decoding the at least one channel in the second cell, to allow for measurement reporting of the second cell.

Certain aspects of the present disclosure provide an apparatus for wireless communication by a user equipment (UE). The apparatus generally includes means for determining, while in a connected state Discontinuous Reception (CDRX) mode in a first cell of a first Radio Access Technology Network (RAT), that a second cell in a second RAT is to be measured, and means for scheduling at least two operational periods related to transitioning between ON and OFF states of the CDRX mode to overlap, to increase a period available for measuring signals in the second cell.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

BRIEF DESCRIPTION OF THE DRAWINGS

FIG. 11 illustrates example operations performed by a UE, for selecting and measuring a GSM cell, in accordance with certain aspects of the present disclosure.

DETAILED DESCRIPTION

Figure 1:
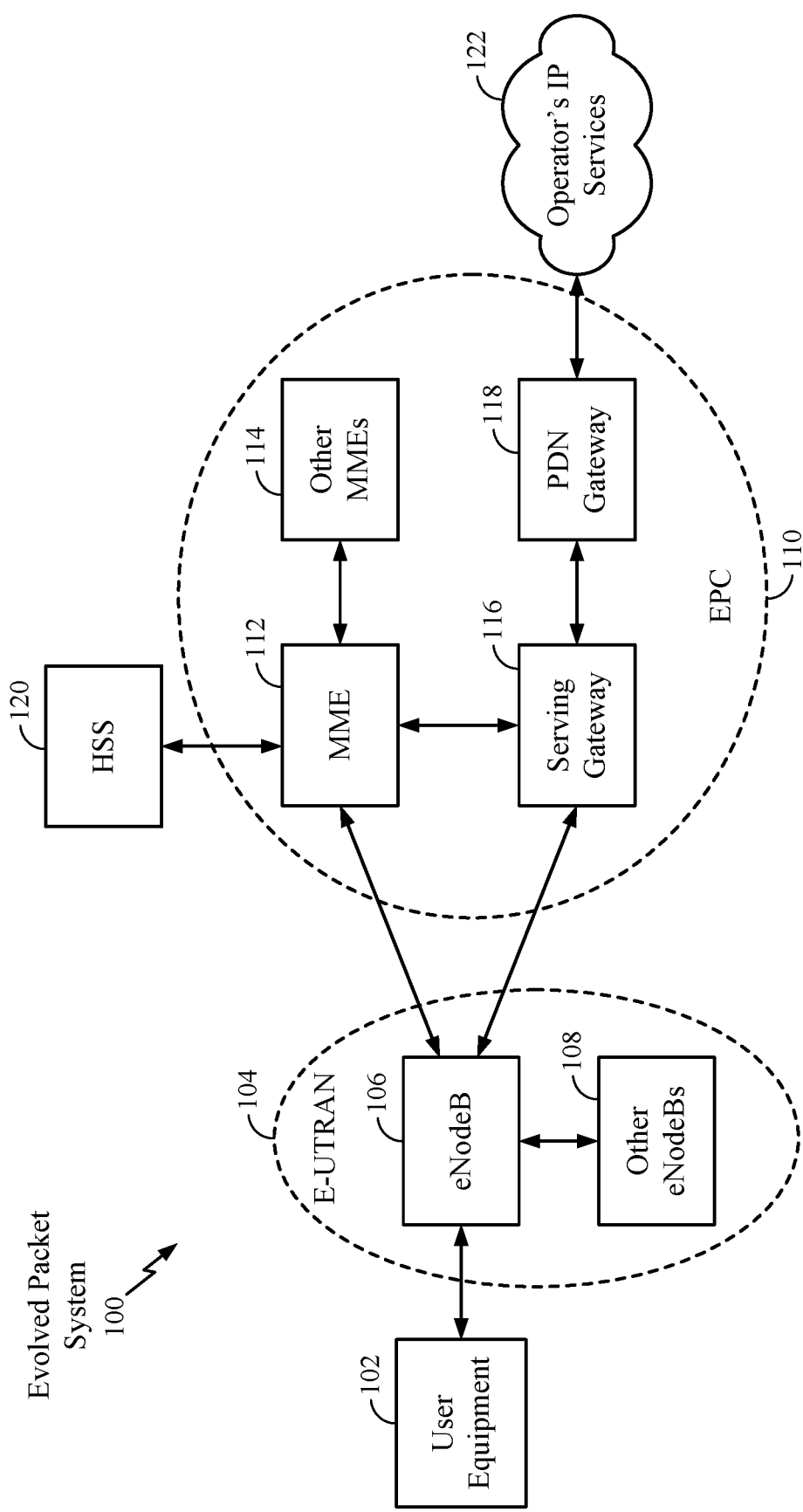
FIG. 1 is a diagram illustrating an example of a network architecture.

Generally, a UE in a voice call over LTE (e.g., Voice over LTE, VoLTE) experiencing weak LTE coverage, but having reasonable GSM coverage may handover the voice call to a suitable GSM cell. However, the UE must first find a suitable GSM cell to handover to. To find a suitable GSM cell, the UE generally must perform measurements in one or more available GSM cells and report the results of the measurements to a serving cell.

LTE specification allocates resources (e.g., time resources) to a UE in a connected mode for performing the GSM measurements (e.g., L2G measurements). Generally the GSM measurements in a GSM cell include measuring RSSI in the cell, and detecting and decoding Frequency Correction Channel (FCCH), Synchronization Channel (SCH), and Base Station Identification Code (BSIC).

As the LTE signal degrades a GSM cell must be found quickly to maintain the voice call. If the network does not get an opportunity to switch the voice call to a GSM cell before the LTE call quality drops below a threshold, the voice call may be dropped. The 6 ms measurement LTE GAPs are generally scheduled 40 ms or 80 ms apart (e.g., with a 40/80 ms periodicity). The GSM FCCH and SCH frames may need to align with a scheduled measurement GAP for the UE to be able to detect and decode the frame. With the periodicity of the GAPs, the likelihood of a GSM frame aligning with a GAP is about 1 every second. Further, once the FCCH is decoded, the UE must wait for the SCH to align with a GAP for SCH decode. In addition, the LTE GAPs may be shared between multiple RATs and frequencies. Also, GAP usage scales up with number of RATs and frequencies. So the likelihood of a GSM frame aligning with a 6 ms GAP is even smaller. Once FCCH and SCH have been decoded, and the GSM signal is good for a period of time (e.g., dictated by TTT timer), the measured GSM cell is reported, and the call may be switched from LTE to GSM.

Thus, L2G connected mode measurements may take a long time (e.g., per 3GPP specification requirements), and the delayed L2G measurements may result in a VoLTE call drops, as a suitable GSM cell may not be found in time for the handover before LTE call quality drops below a threshold.

Aspects of the present discuss techniques for improving inter-RAT measurements (e.g., LTE to GSM, L2G measurements), by reducing the delay caused in decoding GSM frames, to find a suitable GSM cell relatively quickly for handing over a voce call in a UE connected mode.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

In an aspect, a UE (e.g., UE 102) determines, while in a connected state Discontinuous Reception (CDRX) mode in a first cell of a first Radio Access Technology Network (RAT), that a second cell of a second RAT is to be measured. The UE schedules at least two operational periods related to transitioning between ON and OFF states of the CDRX mode to overlap, to increase a period available for measuring signals in the second cell. In an alternative aspect, the UE determines that a voice call is active in the first cell and that one or more conditions relating to reporting of measurements of the second cell are met, and initiates an unscheduled measurement period for measuring a signal in the second cell, in response to the determination. In a another alternative aspect, the UE selects, while in a CDRX mode in a first cell of a first RAT, a second cell from a plurality of cells of a second RAT for decoding at least one channel transmitted in the second cell, and assigns a set of contiguous measurement gaps for decoding the at least one channel in the second cell, to allow for measurement reporting of the second cell.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
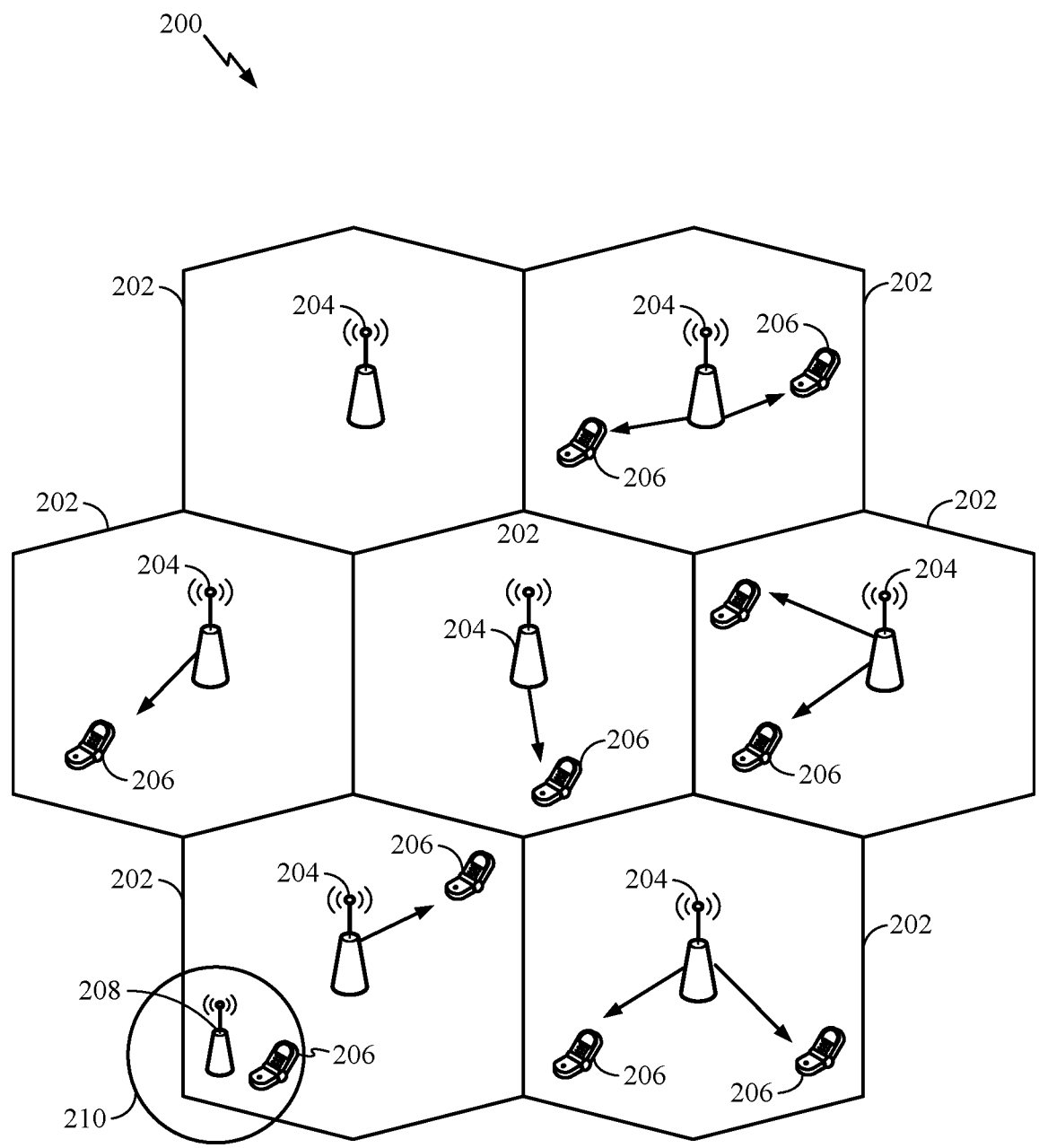
FIG. 2 is a diagram illustrating an example of an access network.

FIG. 2 is a diagram illustrating an example of an access network 200 in an LTE network architecture in which aspects of the present disclosure may be practiced. For example, UEs 206 may be configured to implement techniques for improving inter-RAT measurements described in aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
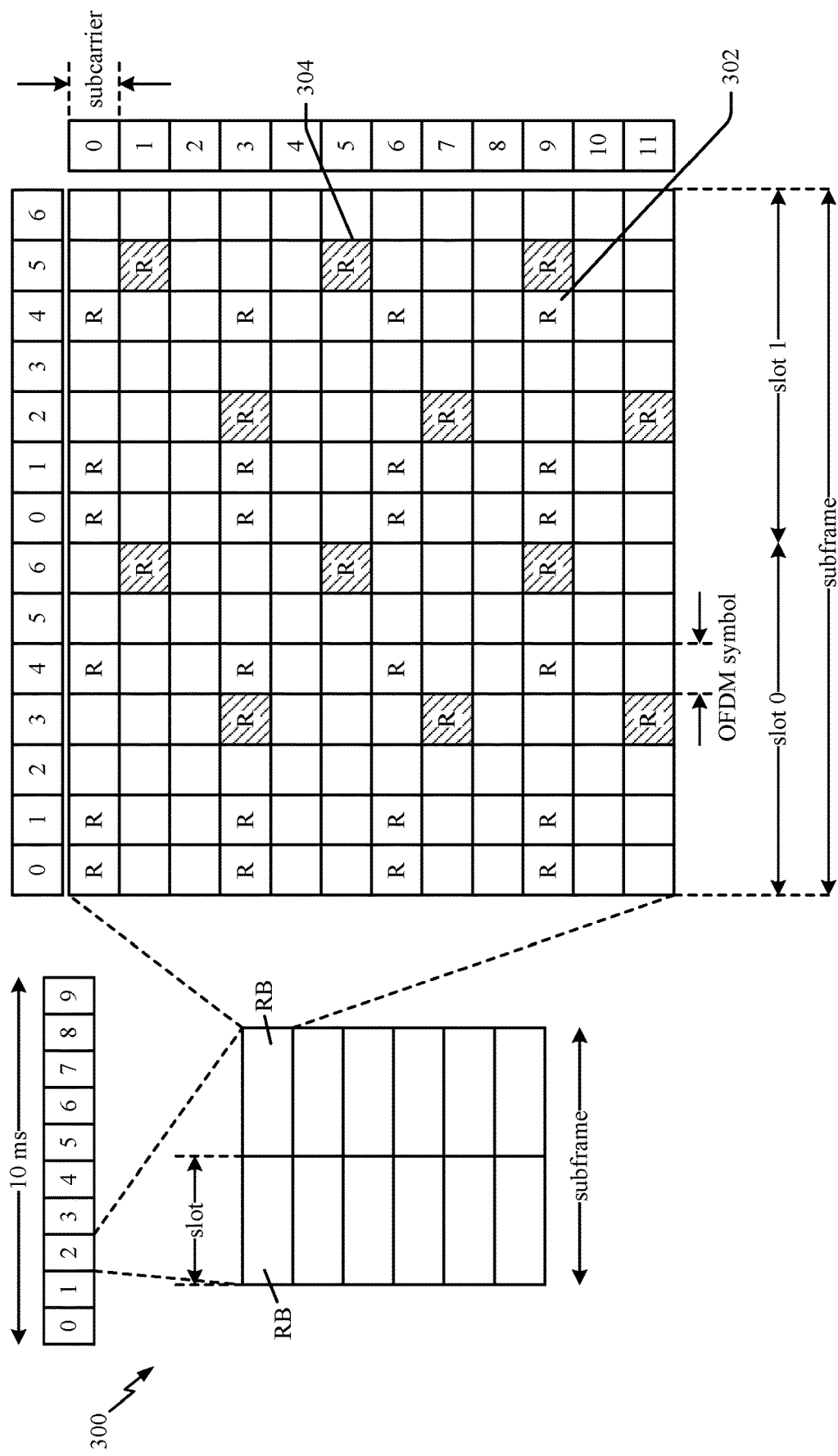
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
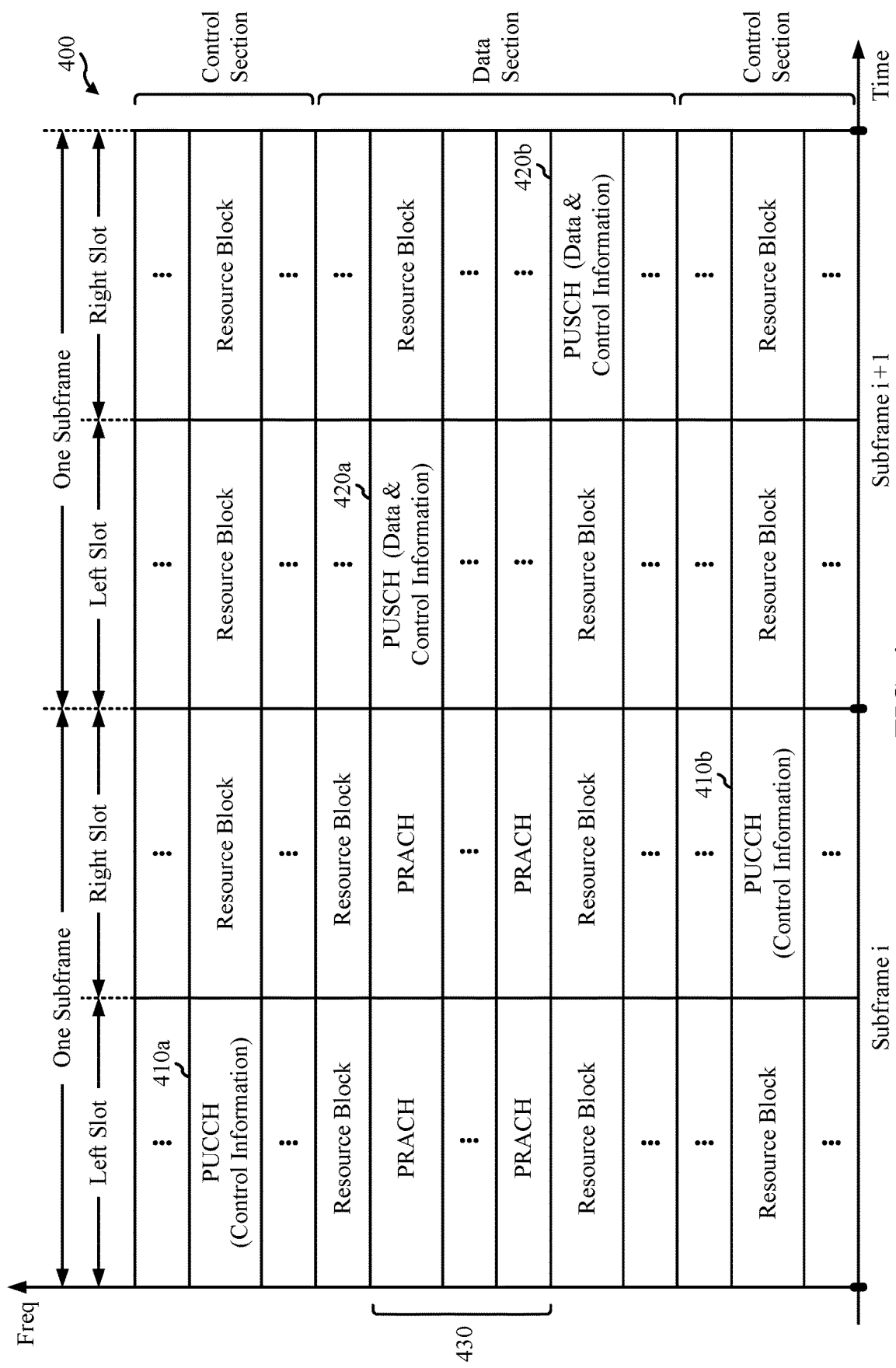
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
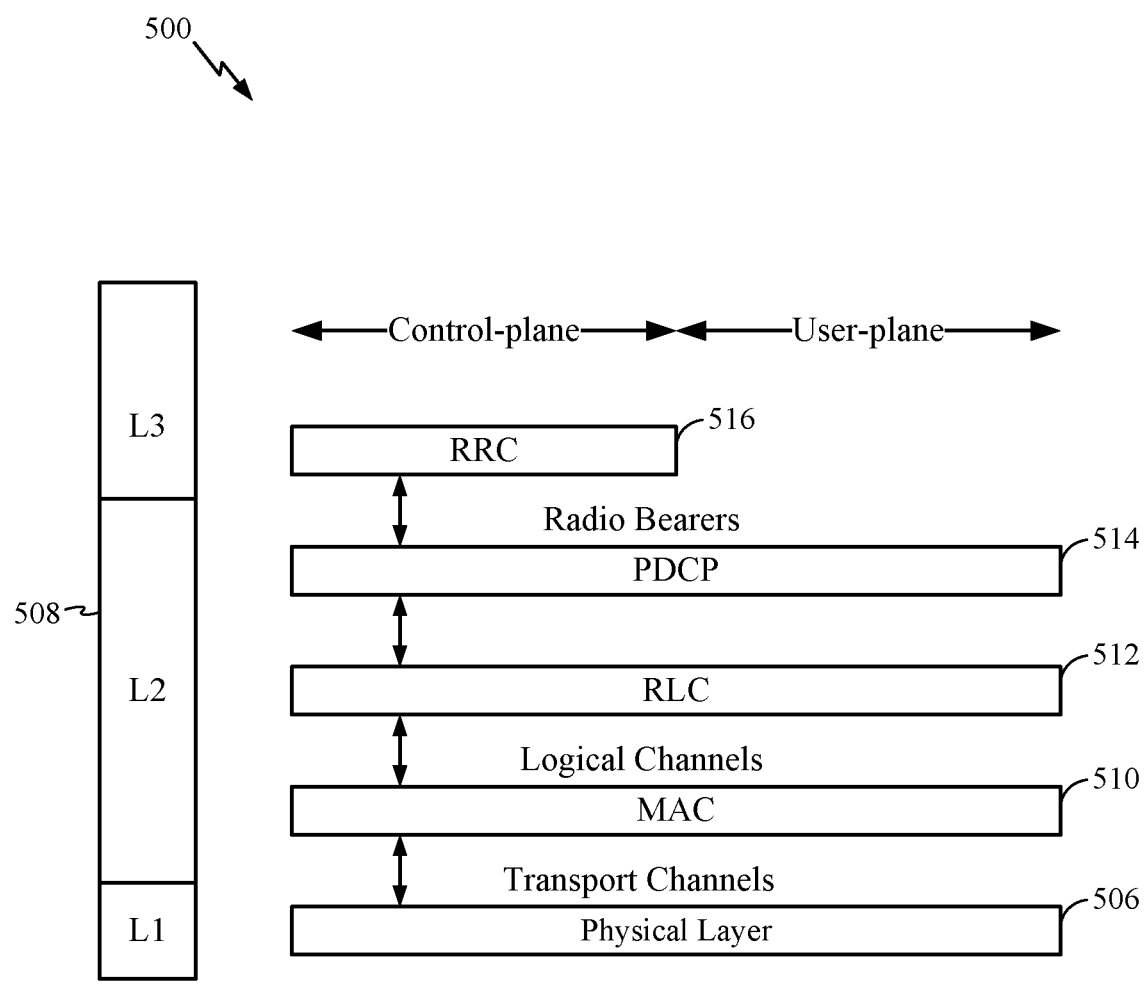
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
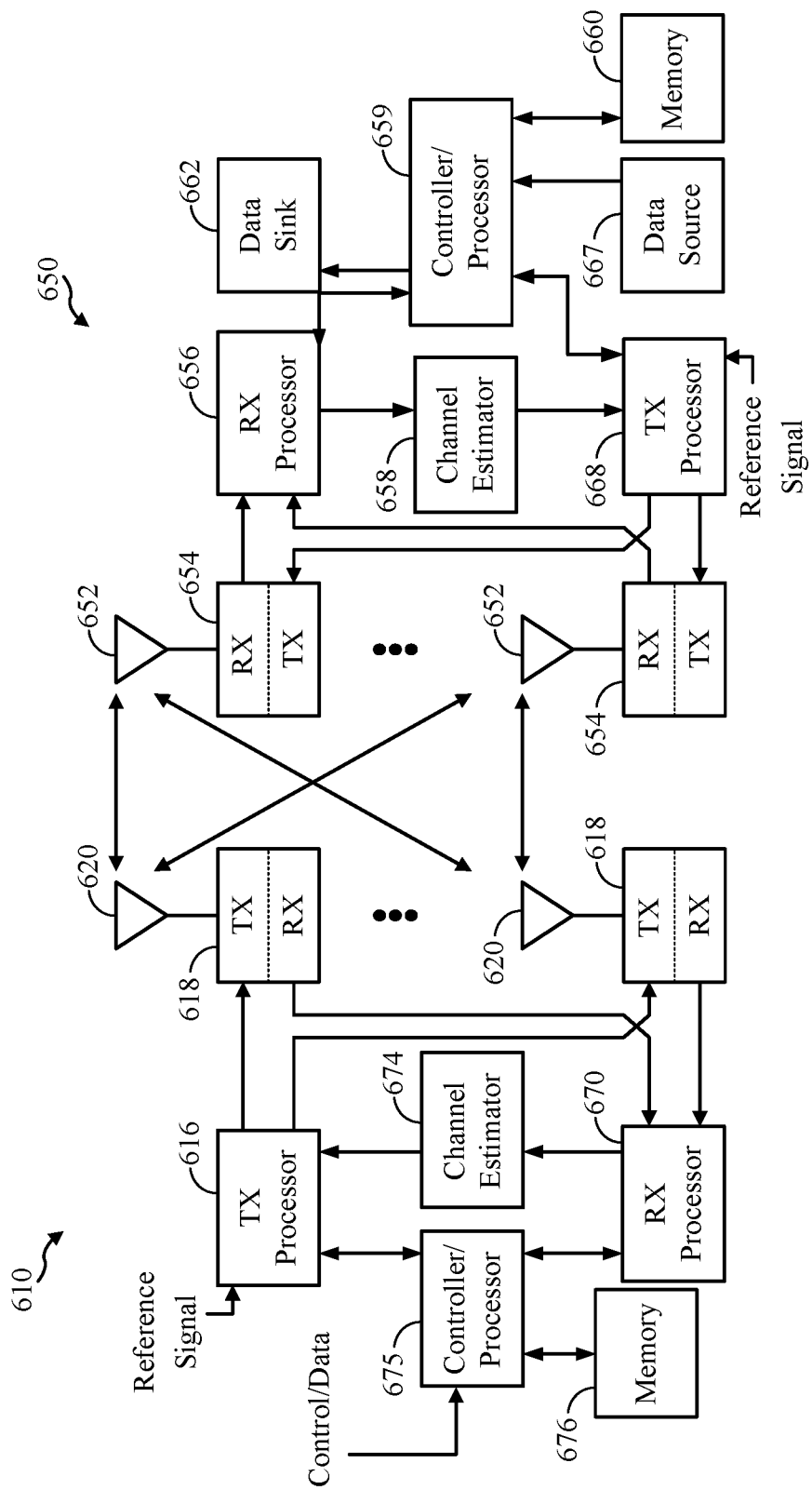
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

In an aspect, a UE (e.g., UE 650) determines, while in a connected state Discontinuous Reception (CDRX) mode in a first cell of a first Radio Access Technology Network (RAT), that a second cell of a second RAT is to be measured. The UE schedules at least two operational periods related to transitioning between ON and OFF states of the CDRX mode to overlap, to increase a period available for measuring signals in the second cell. In an alternative aspect, the UE determines that a voice call is active in the first cell and that one or more conditions relating to reporting of measurements of the second cell are met, and initiates an unscheduled measurement period for measuring a signal in the second cell, in response to the determination. In a another alternative aspect, the UE selects, while in a CDRX mode in a first cell of a first RAT, a second cell from a plurality of cells of a second RAT for decoding at least one channel transmitted in the second cell, and assigns a set of contiguous measurement gaps for decoding the at least one channel in the second cell, to allow for measurement reporting of the second cell.

It may be noted that the UE noted above for implementing the improving inter-Radio Access Technology (RAT) measurements in accordance with certain aspects of the present disclosure may be implemented by a combination of one or more of the controller 659, the RX processor 656 and/or receiver 654 at the UE 650, for example.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 8:
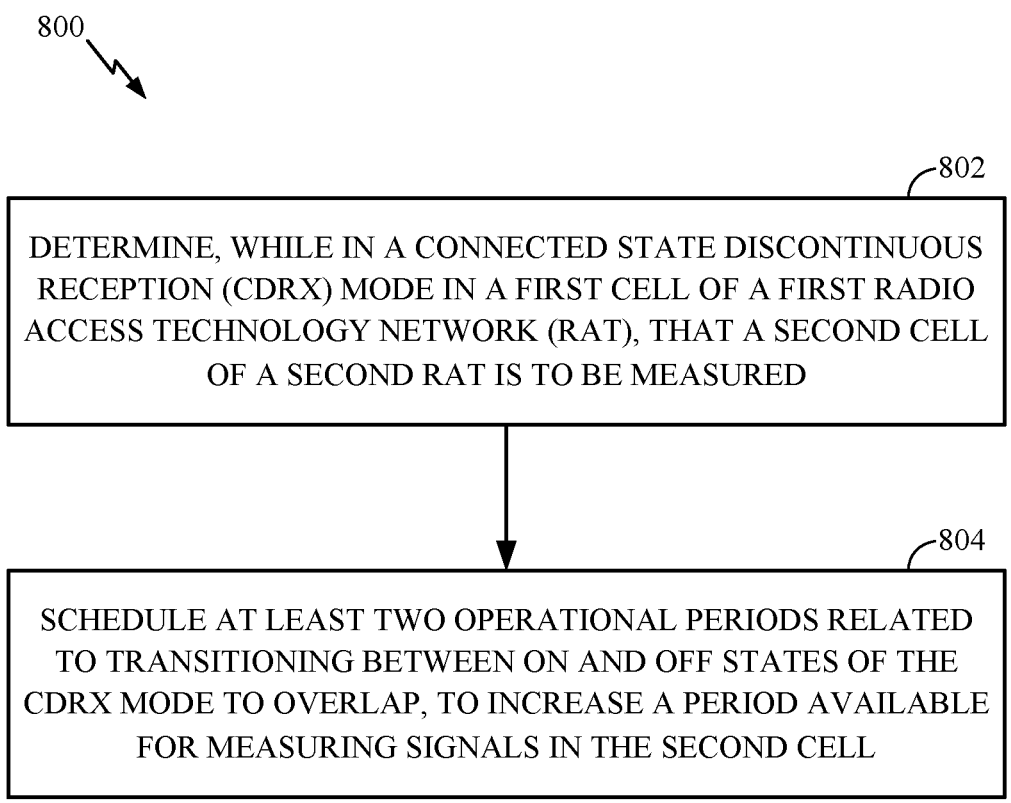
FIG. 8 illustrates example operations, performed by a UE, to enhance GSM measurements during CDRX OFF periods, in accordance with certain aspects of the present disclosure.
Figure 10:
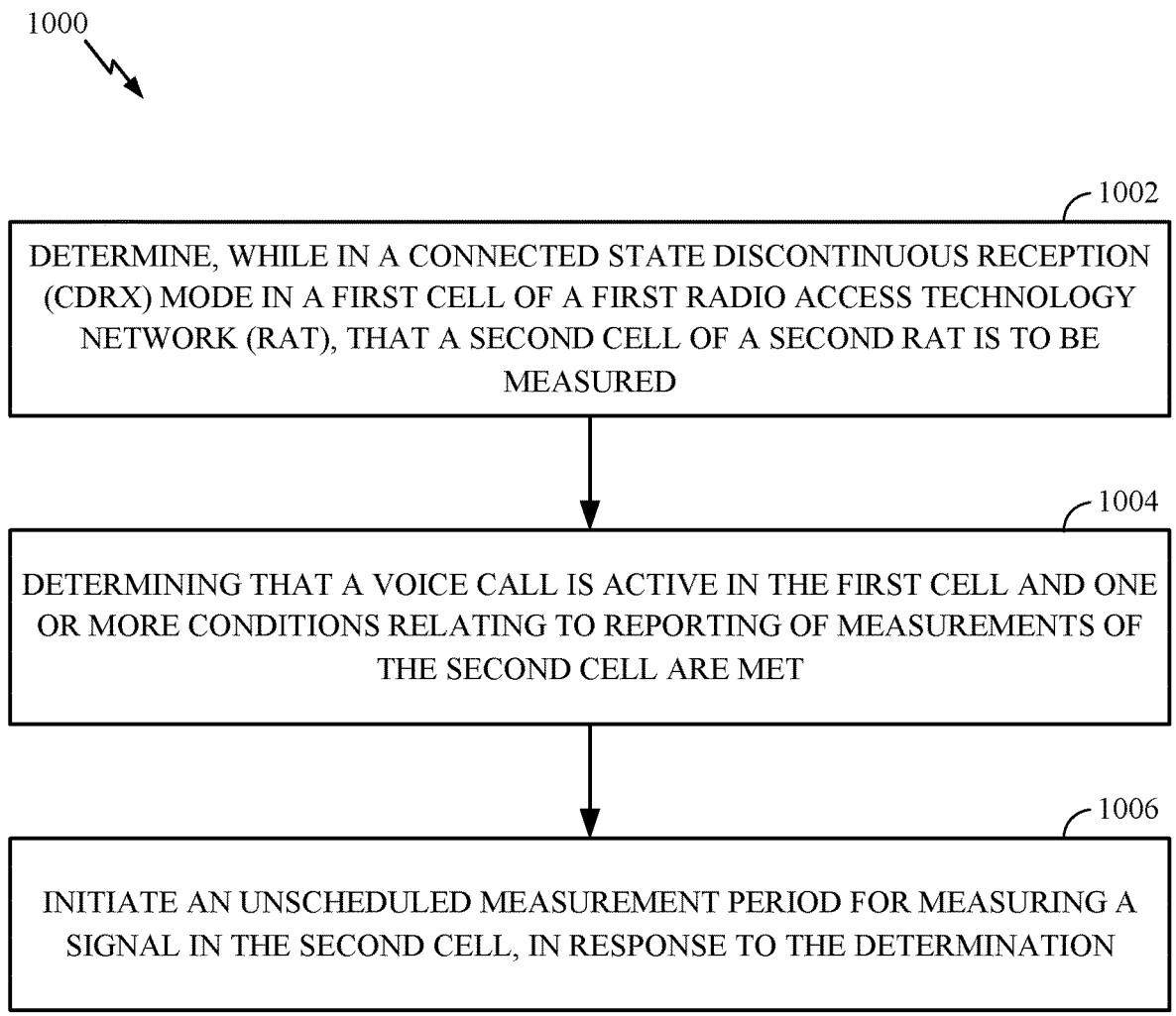
FIG. 10 illustrates example operations, performed by a UE, for providing unscheduled measurement periods for performing inter-RAT measurements, in accordance with certain aspects of the present disclosure.

The controller/processor 659 and/or other processors, components and/or modules at the UE 650 may perform or direct operations, for example, operations 800 in FIG. 8, operations 1000 in FIG. 10, operations 1100 in FIG. 11, and/or other processes for the techniques described herein for improving inter-RAT measurements. In certain aspects, one or more of any of the components shown in FIG. 6 may be employed to perform example operations 800, 1000, and 1100 and/or other processes for the techniques described herein. The memories 660 and 676 may store data and program codes for the UE 650 and eNB 610 respectively, accessible and executable by one or more other components of the UE 650 and the eNB 610.

Example Techniques for Improving Inter-Rat Measurements

Generally, a UE in a voice call over LTE (e.g., Voice over LTE, VoLTE) experiencing weak LTE coverage, but having reasonable GSM coverage may handover the voice call to a suitable GSM cell. However, the UE must first find a suitable GSM cell to handover to. To find a suitable GSM cell, the UE generally must perform measurements in one or more available GSM cells and report the results of the measurements to a serving cell. A suitable GSM cell for handover of the voice call may be determined by the network based on the reported measurements, for example, a GSM cell may be selected having measured Received Signal Strength Indicator (RSSI) satisfying configured thresholds for the measurement reporting and handover.

LTE specification allocates resources (e.g., time resources) to a UE in a connected mode for performing the GSM measurements (e.g., L2G measurements). Generally the GSM measurements in a GSM cell include measuring RSSI in the cell, and detecting and decoding Frequency Correction Channel (FCCH), Synchronization Channel (SCH), and Base Station Identification Code (BSIC). In a GSM system the FCCH and the SCH channels are provided for synchronization purposes of a mobile station.

Figure 7:
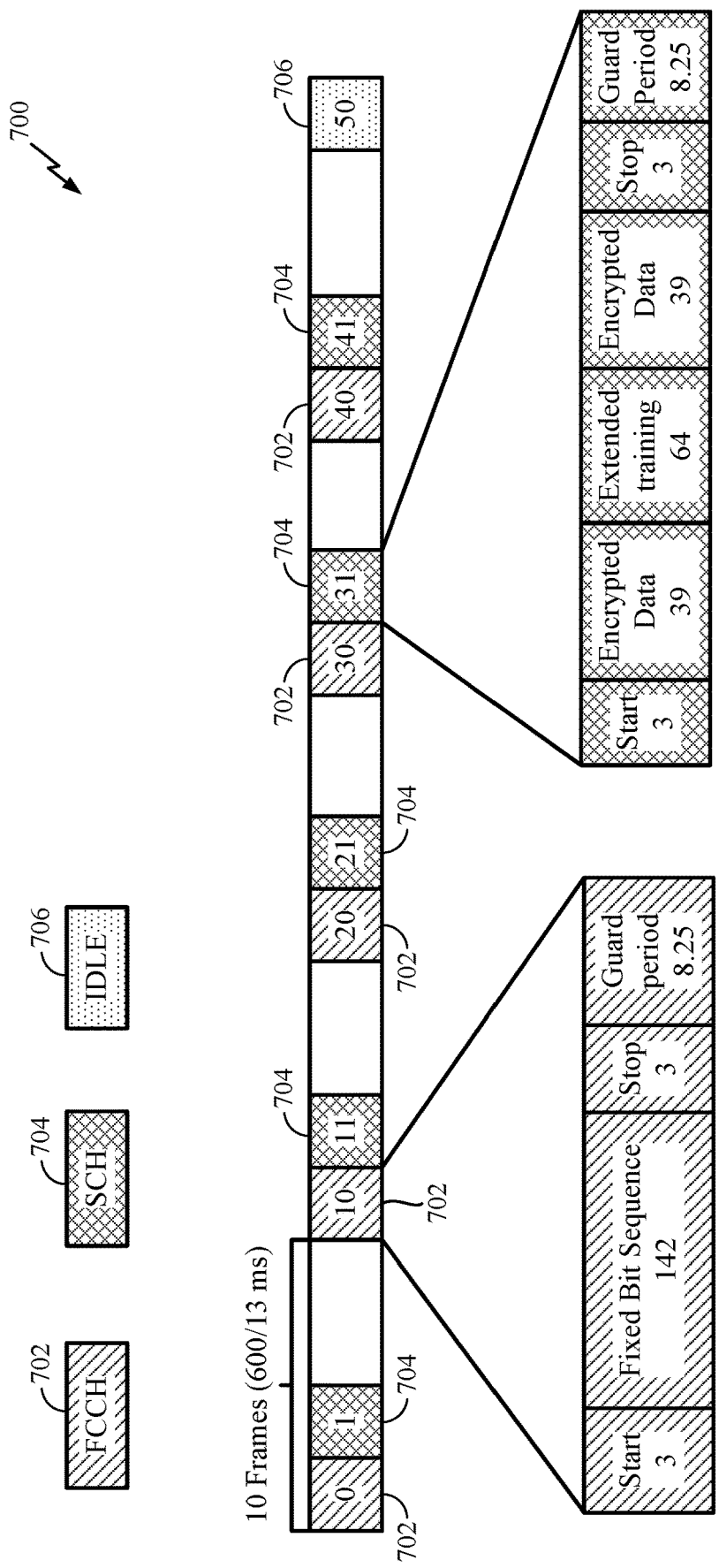
FIG. 7 illustrates an example GSM multiframe structure, in accordance with certain aspects of the present disclosure.

FIG. 7 illustrates an example GSM multiframe structure 700, in accordance with certain aspects of the present disclosure. As shown in FIG. 7, The GSM TDMA multiframe structure 700 includes 51 consecutive GSM frames (e.g., 51 frame multiframe). As shown, the FCCH bursts 702 and the SCH bursts 704 are organized in a time division multiple access structure (TDMA). The FCCH bursts 702 are scheduled at frame numbers 0, 10, 20, 30 and 40 and the SCH bursts 704 are scheduled at frame numbers 1, 11, 21, 31, and 41 of multiframe 700. The GSM multiframe additionally includes an idle period 706 of one frame duration every multiframe. For example, frame 50 of the multiframe structure 700 is an idle frame 706. Generally, after identifying the FCCH burst, the SCH burst that follows 52 burst periods later (e.g., one frame mod 51) may be detected, and the information about the BSIC and reduced frame number (RFN) may be evaluated.

Typically VoLTE calls use Connected State Discontinuous Reception (CDRX). CDRX generally includes alternate CDRX ON and CDRX OFF states. For example, an ON duration of 1 ms or more is scheduled every 40 ms to transmit or receive voice packets, and then the UE may go back to sleep for the next 40 ms OFF duration. Another common CDRX configuration is 10 ms ON and 30 ms OFF. Typically the CDRX ON duration is flexible based on the type of the data. In some cases, the CDRX ON duration may extend until the next CDRX ON time, leading to no OFF time between two ON times. Further, measurement GAPs (typically 6 ms GAPs) may be provided which provide guaranteed OFF time that may be used for measuring other cells of other RATs (e.g., GSM). The 6 ms measurement GAPs may be scheduled anywhere in the CDRX ON time or CDRX OFF time. An ideal position for the measurement GAP in the CDRX OFF period is right before an ON period to ensure that the GAP is not overlapped by a previous extended ON period.

As the LTE (L) signal degrades (e.g., during a connected mode VoLTE call), the network configures B1 and B2 events (e.g., as defined in technical specifications) for measurement reports, which trigger GSM (G) reports when certain RSSI thresholds events are satisfied. A GSM cell must be found quickly to maintain the voice call. If the network does not get an opportunity to switch the voice call to a GSM cell before the LTE call quality drops below a threshold, the voice call may be dropped. The 6 ms measurement LTE GAPs are generally scheduled 40 ms or 80 ms apart (e.g., with a 40/80 ms periodicity). The GSM FCCH and SCH frames may need to align with a scheduled measurement GAP for the UE to be able to detect and decode the frame. With the periodicity of the GAPs, the likelihood of a GSM frame aligning with a GAP is about 1 every second. Further, once the FCCH is decoded, the UE must wait for the SCH to align with a GAP for SCH decode. In addition, the LTE GAPs may be shared between multiple RATs and frequencies. Also, GAP usage scales up with number of RATs and frequencies. So the likelihood of a GSM frame aligning with a 6 ms GAP is even smaller. Once FCCH and SCH have been decoded, and the GSM signal is good for a period of time (e.g., dictated by TTT timer), the measured GSM cell is reported, and the call may be switched from LTE to GSM.

Thus, L2G connected mode measurements may take a long time (e.g., per 3GPP specification requirements), and the delayed L2G measurements may result in VoLTE call drops, as a suitable GSM cell may not be found in time for the handover before LTE call quality drops below a threshold.

Aspects of the present disclosure discuss techniques for improving inter-RAT measurements (e.g., LTE to GSM, L2G measurements), by reducing the delay caused in decoding GSM frames, to find a suitable GSM cell relatively quickly for handing over a voice call in a UE connected mode.

In certain aspects, a UE may be configured to perform GSM measurement during the CDRX OFF periods on the LTE. In certain aspects, certain operations related to transition of the UE between CDRX OFF and ON states may be scheduled to be performed in parallel, to increase the CDRX OFF period available for performing inter-RAT measurements.

FIG. 8 illustrates example operations 800, performed by a UE, to enhance GSM measurements during CDRX OFF periods, in accordance with certain aspects of the present disclosure. Operations 800 begin, at 802, by determining, while in a CDRX mode in a first cell of a first RAT (e.g., LTE), that a second cell of a second RAT (e.g., GSM) is to be measured. At 804, the UE may schedule at least two operational periods related to transitioning between ON and OFF states of the CDRX mode to overlap, to increase a period available for measuring signals in the second cell of the second RAT.

In certain aspects, this technique is an extension to the CDRX OFF measurements. In an aspect, the GSM measurement duration is increased by overlapping some of the operations to improve the quality of the measurements.

Figure 9:
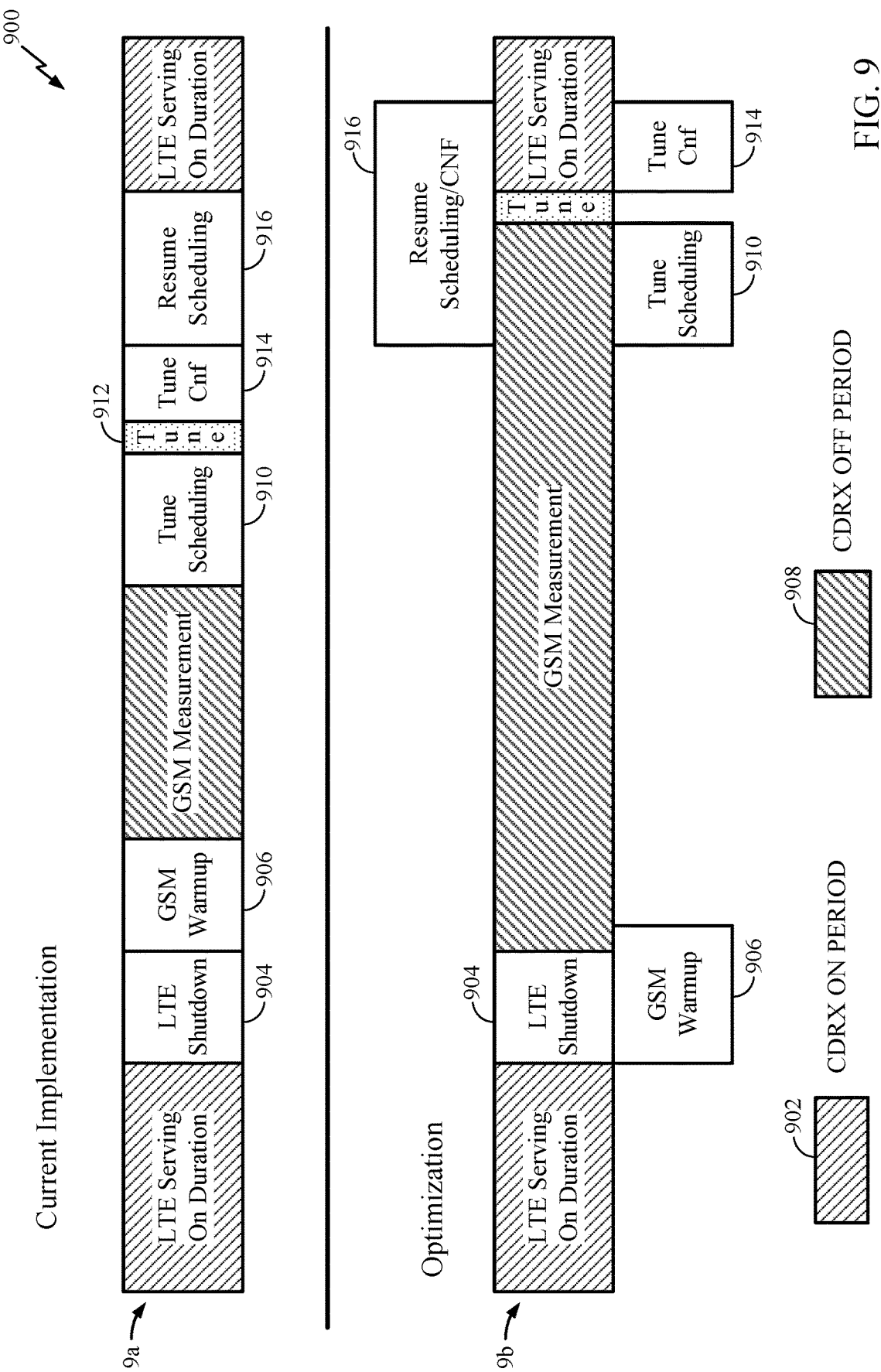
FIG. 9 illustrates a comparison of the GSM measurements performed during LTE CDRX OFF periods in current systems and in accordance with aspects of the present disclosure.

FIG. 9 illustrates a comparison 900 of the GSM measurements performed during LTE CDRX OFF periods in current systems and in accordance with aspects of the present disclosure. FIG. 9 shows a UE transitioning out (e.g., tuning out) of an LTE CDRX ON period 902 to a LTE CDRX OFF period 908, and then transitioning back (e.g., tuning back) from the LTE CDRX OFF period 908 to the next LTE CDRX ON period. As shown in FIG. 9, the UE performs GSM measurements (e.g., including FCCH, SCH, and/or BSIC decode) during the CDRX OFF period 908. The transitioning from the CDRX ON to CDRX OFF periods includes an LTE shutdown operational period 904 and GSM warmup operational period 906. The transitioning back from the CDRX OFF to CDRX ON periods includes, tune scheduling period 910, tune period 912, tune confirmation (CNF) period 914, and resume scheduling period 916.

9a shows L2G measurements in current systems and 9b shows L2G measurements according to aspects of the present disclosure. As shown, same reference numerals are used to identify similar periods in both 9a and 9b. As shown in 9a, the LTE shutdown 904 and the GSM warmup 906 are performed in sequence leading to the operational periods 904 and 906 respectively corresponding to these operations being sequential. Similarly, the tune scheduling period 910, tune period 912, tune confirmation period 914, and resume scheduling period 916 are in sequence as operations corresponding to these periods are also performed in sequence.

In certain aspects of the present disclosure, the CDRX OFF period 908 may be increased by scheduling one or more of the above discussed operations relating to transition of the UE between CDRX ON and OFF periods, so that one or more of the operational periods overlap allowing more time for inter-RAT measurements (e.g., GSM measurements). For example, as shown in 9b, while transitioning from the CDRX On period 902 to the CDRX OFF period 908, LTE shutdown 904 and GSM warmup 906 periods are overlapped by scheduling the corresponding operations in a pipelined or parallel manner. Similarly, the tune scheduling period 910, tune period 912, tune confirmation period 914, and resume scheduling period 916 are overlapped by scheduling one or more operations corresponding to these periods in a pipelined or parallel manner. As shown, overlapping these operational periods provides a longer CDRX OFF duration that may be used for GSM measurements. A longer GSM measurement period increases the likelihood of a GSM frame to be measured (e.g., FCCH, SCH) aligning with the measurement periods, and may result in relatively quicker decodes and reporting.

Further, in certain current systems, L2G measurements in the CDRX OFF state are disabled while measurement GAPs are configured. The measurements are enabled only when GAPs are not configured. In certain aspects, in addition to overlapping the operational periods during transition of the UE between CDRX ON and OFF states, inter-RAT measurements (e.g., GSM measurements) may be enabled in the CDRX OFF state between scheduled measurement GAPs.

In certain aspects, unscheduled measurement periods may be provided for performing GSM measurements if one or more conditions relating to reporting GSM measurements are satisfied.

FIG. 10 illustrates example operations 1000, performed by a UE, for providing unscheduled measurement periods for performing inter-RAT measurements, in accordance with certain aspects of the present disclosure. Operations 1000 begin, at 1002, by determining, while in a CDRX mode in a first cell of a first RAT (e.g. LTE), that a second cell of a second RAT (e.g., GSM) is to be measured. At 1004, the UE determines that a voice call is active in the first cell and one or more conditions relating to reporting of measurements of the second cell are met. At 1004, the UE initiates an unscheduled measurement period for measuring a signal in the second cell.

In certain aspects, if certain conditions relating to reporting measurements in a GSM cell are satisfied, a CDRX ON period or a CDRX OFF period may be interrupted to initiate an unscheduled measurement period for performing measurements (e.g., including FCCH, SCH decode, and/or BSIC) in the GSM cell. In an aspect, one of the conditions for initiating the unscheduled measurement period is that a voice call is active over the LTE (e.g., VoLTE). Additionally or alternatively, another condition is that reporting criteria including configured reporting RSSI thresholds for configured B1 and B2 reports are satisfied, indicating that the GSM cell to be reported is a relatively reliable cell for transfer or handover of the voice call. For example, if a B1 report is configured, then the GSM cell RSSI for the best GSM cell should satisfy or be greater than a B1 threshold. If a B2 report is configured, then the GSM cell RSSI for the best cell should satisfy or be greater than a B2 threshold and an LTE RSRP should satisfy or be greater than the B2 threshold. Additionally or alternatively, another condition may be that the decoding of at least one GSM frame is pending, for example, BSIC decode is pending. Additionally or alternatively, another condition may be that a configurable timer has expired, the timer providing a configurable period of time for the UE to attempt decoding the pending GSM channel, before the unscheduled measurement period may be initiated. In an aspect, the configurable timer is initiated when a voice call is active, the reporting RSSI thresholds are satisfied for the cell, and decoding of at least one GSM channel in the cell is pending. It may be noted, that one or more of the above discussed conditions may have to be satisfied for a cell in order to initiate an unscheduled measurement period for the cell.

In an aspect, the RSSI measurements are much quicker than the FCCH, SCH and/or BSIC decodes. In an aspect, the UE may measure RSSIs of as much as 10 cells in one GAP period, for example. However, as discussed above, alignment of FCCH and SCH frames with the scheduled GAPs or CDRX OFF periods may take time. Thus, in a situation when the UE has measured the RSSI of a GSM cell and determined that that the B1 and B2 RSSI thresholds are satisfied and FCCH/SCH/BSIC decode has not been successful for a configured periods of time, unscheduled measurement periods may be used by the UE to measure these channels. In an aspect, the unscheduled period is used if a GSM cell to be measured is a viable cell for a handover. For example, the unscheduled measurement period is initiated only if the B1 and B2 RSSI thresholds are met, ensuring to a good extent that the GSM cell to be measured is a viable cell, e.g., power of the cell is strong enough to be a handover candidate. In an aspect, the timer is terminated when the at least one channel is successfully decoded.

In an aspect, a large enough period may be provided so that at least one FCCH/SCH frame aligns with the initiated period. For example, referring to FIG. 9 discussed above, the LTE CDRX ON period 902 may be skipped and merged with the CDRX OFF duration to provide a large measurement period for a better likelihood of a GSM frame aligning with the large measurement period. In an aspect, the unscheduled measurement period is terminated when the at least one pending GSM frame is successfully decoded. In an aspect, a maximum number of unscheduled measurement periods may be set in a given time. For example, a counter may be used that caps the maximum number of unscheduled measurement periods that can be initiated for L2G measurements. Further, a minimum time interval may be defined between successive unscheduled measurement periods.

In certain aspects, a UE, while in a CDRX mode in LTE may have several GSM cells available for handover. Aspects of the present disclosure provide a technique for selecting a suitable cell for measurement amongst the available cells, and then quickly decoding one or more channels in the selected cell.

FIG. 11 illustrates example operations 1100 performed by a UE, for selecting and measuring a GSM cell, in accordance with certain aspects of the present disclosure. Operations 1100 begin, at 1102, by selecting, while in a CDRX mode in a first cell of a first RAT (e.g., LTE), a second cell from a plurality of cells of a second RAT for decoding at least one channel (e.g., FCCH/SCH) transmitted in the second cell. At 1104, the UE assigns a set of contiguous measurement gaps for decoding the at least one channel in the second cell, to allow for measurement reporting of the second cell.

In certain aspects, a GSM cell may be selected from a plurality of available GSM cells for measurement based on a special scheduling scheme discussed below. Once a GSM cell is selected for measurement, an accelerated GAP pattern, including consecutive measurement GAPs assigned to measure the selected GSM cell, may be used to quickly decode one or more channels in the selected cell.

Figure 12:
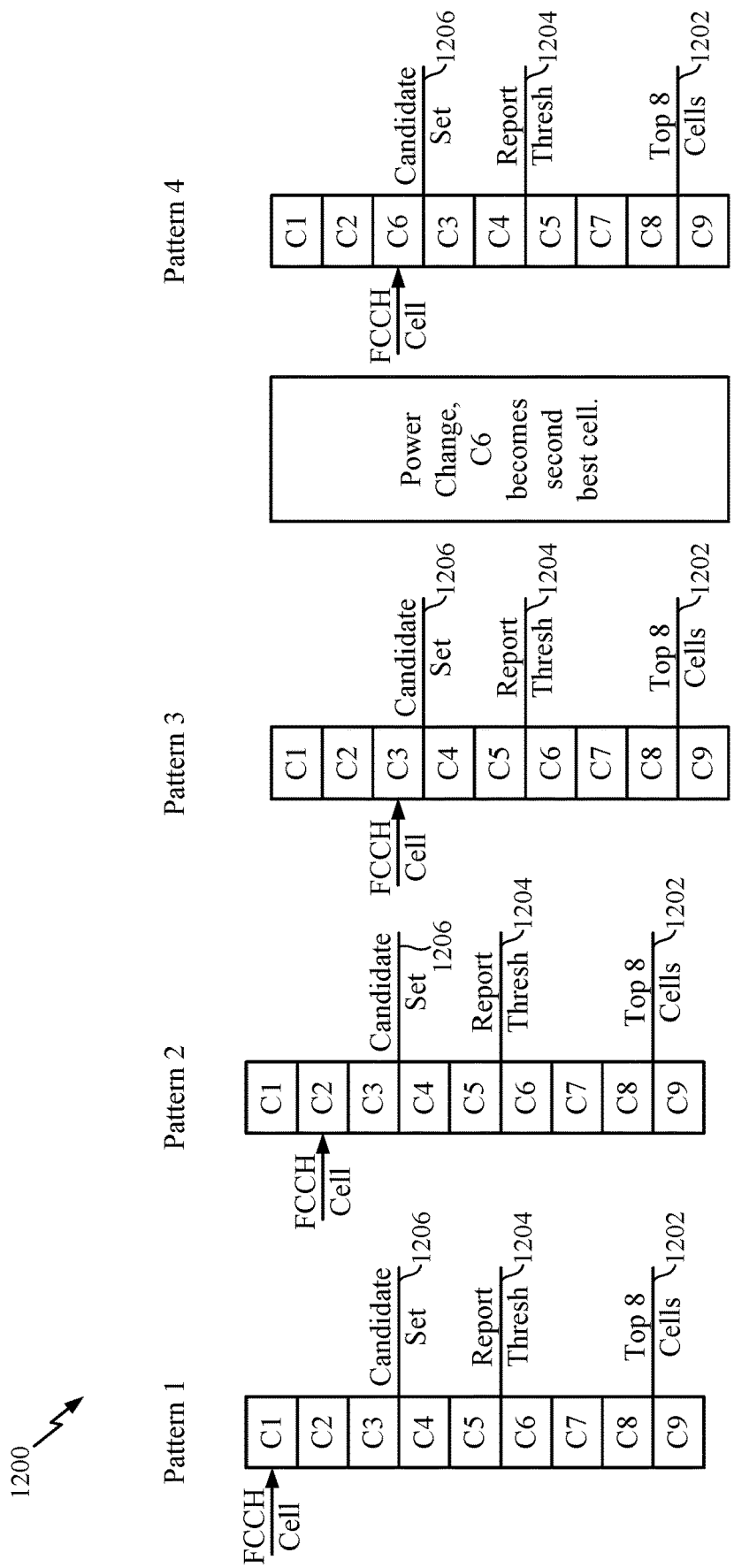
FIG. 12 illustrates selection of a cell from a plurality of available cells for measurement, in accordance with certain aspects of the present disclosure.

FIG. 12 illustrates selection 1200 of a cell from a plurality of available cells for measurement, in accordance with certain aspects of the present disclosure. In certain aspects, RSSI for each available GSM cell is measured and the available cells are sorted by their measured RSSI. Each cell is ranked based on its measured RSSI and the top 8 cells 1202 (e.g. C1-C8), for example, are identified as potentially viable cells which have the largest measured RSSIs amongst the available cells. In an aspect, cells that satisfy or exceed a reporting threshold 1204 (e.g., configured B1/B2 RSSI thresholds) are suitable for using the accelerated gap pattern. As shown, cells C1-C5 satisfy the configured reporting threshold 1204, and thus are suitable for using the accelerated gap pattern.

In an aspect, a cell with the largest measured RSSI value may be selected for FCCH decode from the cells satisfying the reporting threshold. However, RSSI may not be a reliable indicator of a best cell for handover, for example due to interference issues. Thus, the cell with the highest measured RSSI may be the most reliable candidate cell for a handover.

In certain aspects, a candidate set 1206 of top cells (e.g., including 3 cells C1-C3 as shown in FIG. 12) is identified having better RSSI values than remaining cells (e.g., the three largest values of their measured RSSIs). In the candidate set 1206, C1 has the largest RSSI value and C3 has the smallest RSSI value. In certain aspects, the cells are selected for measurement from the identified candidate set as FCCH cell for FCCH decode, one at a time, in a round robin fashion. Thus, Instead of sticking to one cell having highest RSSI, top GSM cells to be measured are quickly switched, for example, rotated through the top 3 cells based on their RSSI. Other cells may be rotated in, for example, based on their changed RSSI or new implementation. Thus, by quickly rotating the cells, it may be ensured that if the cell with the highest RSSI has a lot of interference, another cell with a lower RSSI but higher SNR may be found and reported quickly.

For example, each of the patterns 1-4 shown in FIG. 12 schedules a different FCCH cell for measurement. In an aspect, the UE moves on to a next pattern after attempting to decode a channel (e.g., FCCH) in a previous cell according to a previous pattern. For example, pattern 1 selects C1 as the FCCH cell, pattern 2 selects C2 as the FCCH cell, and pattern 3 selects C3 as the FCCH cell. In an aspect, the UE may measure RSSI of each of the top 8 cells and update the candidate set of cells according to the updated RSSI measurements. For example, as shown in FIG. 12, after executing pattern 3, the UE detects a power change and replaces C3 with C6 in the candidate set. This may happen when the RSSI of C6 exceeds the RSSI of C3. As shown pattern 4, has a new candidate set including cells C1, C2, and C6, and with C6 selected as the FCCH cell for FCCH decode.

In an aspect, a pattern selects a cell from the candidate set for FCCH decode, with the least number of FCCH frames attempted for FCCH decode. For example, pattern 1 selects C1 with the least number of attempted FCCH decodes, pattern 2 selects C2 with the second least number of attempted FCCH decodes, and pattern 3 selects C3 with the next least number of attempted FCCH decodes. In an aspect, if two cells in the candidate set have the same number of FCCH decodes, the cell with the larger measured RSSI is selected. In an aspect, the UE may execute patterns 1-3 in a round robin fashion, until the candidate set is updated. This may allow multiple attempts at decoding FCCH of a particular cell for a better likelihood of a successful decode and finding a best cell for handover.

Figure 13:
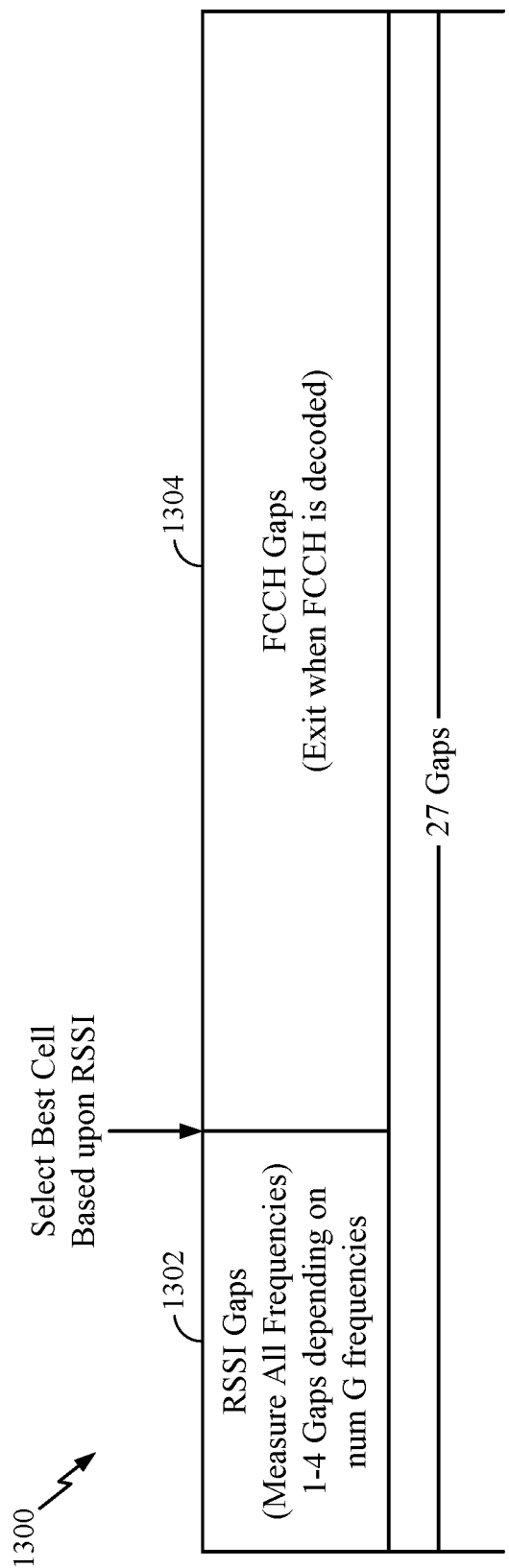
FIG. 13 illustrates an accelerated gap pattern usable for selecting a GSM cell and for decoding at least one channel in the selected cell, in accordance with certain aspects of the present disclosure.

In certain aspects, an accelerated gap pattern may be used to measure RSSI of available GSM cells, for FCCH decode of a selected FCCH cell, and/or BSIC decode of the selected FCCH cell. FIG. 13 illustrates an accelerated gap pattern 1300 usable for selecting a GSM cell and for decoding at least one channel in the selected cell, in accordance with certain aspects of the present disclosure. In certain aspects, contiguous scheduled measurement periods (e.g., LTE measurement GAPs or CDRX OFF periods scheduled for inter-RAT measurements) or unscheduled measurement periods may be dedicated for measuring RSSI of available GSM cells and for decoding at least one channel (e.g., FCCH) of a selected GSM cell. For example, a contiguous number of scheduled measurement GAPs (e.g., 27 GAPs as shown in FIG. 13) may be assigned for GSM cell decoding, for example, regardless of whether one or more of these GAPs are allocated for measuring non GSM RATs.

In an aspect, a first portion of the contiguous gaps may be used for measuring RSSI of all available cells so that a best cell may be selected for FCCH,SCH and/or BSIC decode based on the measured RSSI. For example, as shown in FIG. 13, a first portion 1302 including 1-4 gap periods is assigned for measuring RSSIs of available cells, depending on the number of GSM frequencies to measure. In an aspect, the best cell for FCCH decode may be selected based on the methods discussed with respect to FIG. 12. Once a best cell is selected for FCCH decode, a remaining portion of the contiguous gaps may be used for decoding at least one GSM control channel (e.g., FCCH/SCH/BSIC). For example, as shown in FIG. 13, a remaining portion 1304 including gaps remaining after RSSI measurements is assigned for decoding FCCH,SCH and/or BSIC of the selected best cell. In an aspect, by scheduling a large chunk of contiguous measurement periods, a chance (e.g., it is almost guaranteed) that at least one FCCH/SCH frame of the selected cell aligns with the measurement period. In an aspect, although gap periods originally assigned to other RATs is used for GSM, the impact on other RATs is minimal, since SCH alignment with gaps is rare. However, this technique greatly speeds GSM reporting.

In an aspect, the accelerated gap pattern may be exited if the FCCH/SCH/BSIC decode for the selected cell is successful. In certain aspects, an accelerated gap pattern may be used for FCCH decode relating to each of the patterns 1-4 discussed with reference to FIG. 12.

It may be noted that while FIG. 13 illustrates an accelerated gap pattern using scheduled LTE measurement GAPs, the technique may work equally well by using contiguous CDRX OFF periods for the accelerated gap pattern.

In an aspect, the Time to Trigger (TTT) timer is started upon FCCH decode instead of BSIC decode, ensuring that a decoded FCCH is good for a certain period of time. Further, in an aspect, the L2G measurement timeline may be maintained upon receipt of an RRCConnectionReconfiguration message, (e.g., instead of reinitializing the schedule, timers, and/or states for FCCH decode) unless the GSM cell is removed from the measurement object.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication by a user equipment (UE), comprising:
   determining, while in a connected state Discontinuous Reception (CDRX) mode in a first cell of a first Radio Access Technology Network (RAT), that a second cell of a second RAT is to be measured; and
   scheduling at least two operations related to transition of the UE between ON and OFF states of the CDRX mode to be performed simultaneously, to increase a period available in the OFF state for measuring signals in the second cell,
   wherein the scheduling the at least two operations comprises at least one of:
      scheduling at least two of the operations related to tuning out of the first RAT and tuning in to the second RAT to overlap, or
      scheduling at least two of the operations related to tuning out of the second RAT and tuning back to the first RAT to overlap.

2. The method of claim 1, wherein increasing the period for measuring the signals in the second cell comprises increasing a period between scheduled measurement gaps that are used for measuring inter-Radio Access Technology (RAT) signals.

3. The method of claim 1, wherein at least one of:
   the first RAT comprises Long Term Evolution (LTE); or
   the second RAT comprises Global System for Mobile Communications (GSM), evDO, 1xRTT, or WCDMA.

4. An apparatus for wireless communication by a user equipment (UE), comprising:
   means for determining, while in a connected state Discontinuous Reception (CDRX) mode in a first cell of a first Radio Access Technology Network (RAT), that a second cell of a second RAT is to be measured; and
   means for scheduling at least two operations related to transition of the UE between ON and OFF states of the CDRX mode to be performed simultaneously, to increase a period available in the OFF state for measuring signals in the second cell,
   wherein the means for scheduling the at least two operational periods is configured to perform at least one of:
      scheduling at least two of the operations related to tuning out of the first RAT and tuning in to the second RAT to overlap, or
      scheduling at least two of the operations related to tuning out of the second RAT and tuning back to the first RAT to overlap.

5. The apparatus of claim 4, wherein increasing the period for measuring the signals in the second cell comprises increasing a period between scheduled measurement gaps that are used for measuring inter-Radio Access Technology (RAT) signals.

6. The apparatus of claim 4, wherein at least one of:
   the first RAT comprises Long Term Evolution (LTE); or
   the second RAT comprises Global System for Mobile Communications (GSM), evDO, 1xRTT, or WCDMA.

7. An apparatus for wireless communication by a user equipment (UE), comprising:
   at least one processor configured to:
      determine, while in a connected state Discontinuous Reception (CDRX) mode in a first cell of a first Radio Access Technology Network (RAT), that a second cell of a second RAT is to be measured; and
      schedule at least two operations related to transition of the UE between ON and OFF states of the CDRX mode to be performed simultaneously, to increase a period available in the OFF state for measuring signals in the second cell,
      wherein the at least one processor schedules the at least two operations by:
         scheduling at least two of the operations related to tuning out of the first RAT and tuning in to the second RAT to overlap, or
         scheduling at least two of the operations related to tuning out of the second RAT and tuning back to the first RAT to overlap; and
   a memory coupled to the at least one processor.

8. The apparatus of claim 7, wherein the at least one processor increases the period for measuring the signals in the second cell by increasing a period between scheduled measurement gaps that are used for measuring inter-Radio Access Technology (RAT) signals.

9. The apparatus of claim 7, wherein at least one of:
   the first RAT comprises Long Term Evolution (LTE); or
   the second RAT comprises Global System for Mobile Communications (GSM), evDO, 1xRTT, or WCDMA.

10. A non-transitory computer-readable medium for wireless communication by a user equipment (UE), the computer-readable medium storing instructions executable by at least one processor for performing a method comprising:
    determining, while in a connected state Discontinuous Reception (CDRX) mode in a first cell of a first Radio Access Technology Network (RAT), that a second cell of a second RAT is to be measured; and
    scheduling at least two operations related to transition of the UE between ON and OFF states of the CDRX mode to be performed simultaneously, to increase a period available in the OFF state for measuring signals in the second cell,
    wherein the scheduling the at least two operations comprises at least one of:
       scheduling at least two of the operations related to tuning out of the first RAT and tuning in to the second RAT to overlap, or
       scheduling at least two of the operations related to tuning out of the second RAT and tuning back to the first RAT to overlap.

11. The computer-readable medium of claim 10, wherein increasing the period for measuring the signals in the second cell comprises increasing a period between scheduled measurement gaps that are used for measuring inter-Radio Access Technology (RAT) signals.

12. The computer-readable medium of claim 10, wherein at least one of:
    the first RAT comprises Long Term Evolution (LTE); or
    the second RAT comprises Global System for Mobile Communications (GSM), evDO, 1xRTT, or WCDMA.

* * * * *